324-77. SR 02-13-73 OR 3,716,785

Feb. 13, 1973 H. M. MASTERS ET AL 3,716,785

DIGITALLY CONTROLLED WAVE ANALYZER

Filed June 22, 1971 4 Sheets-Sheet 1

DIGITALLY CONTROLLED WAVE ANALYZER

Filed June 22, 1971 4 Sheets-Sheet 4

3,716,785

DIGITALLY CONTROLLED WAVE ANALYZER

Harvey M. Masters, Ellicott City, and John L. Nugent, Martin Hunt, and James Peters, Baltimore, Md., assignors to Westinghouse Electric Corporation, Pittsburgh, Pa.

Filed June 22, 1971, Ser. No. 155,495
Int. Cl. G01r *27/00*
U.S. Cl. 324—77 B 10 Claims

ABSTRACT OF THE DISCLOSURE

Apparatus for measuring noise spectra, both AM (amplitude modulation) and FM (frequency modulation), of RF signals over a predetermined frequency range by sweeping a variable frequency square wave oscillator by means of an analog ramp signal generated by a digital sweep circuit which produces a sequence of square wave pulses whose pulsewidth incrementally increases by the same amount over a predetermined time period. The variable frequency oscillator is driven and automatic frequency controlled from a digital clock oscillator which is also fed to a mixer. This mixer is directly coupled to a first mixer which has inputs comprising the noise signal input and the variable frequency oscillator signal applied thereto. The first and second mixer configuration provides a frequency window through which the desired noise waveform can be detected and measured. The system sweeps a predetermined frequency band and when a noise signal of predetermined amplitude is detected, the sweep circuit is automatically stopped, thereby locking onto an input signal of excessive noise level.

CROSS-REFERENCE TO RELATED APPLICATION

The present invention is directed to a portion of an RF noise and modulation analyzer system which is controlled or remotely programmed by a computer. Said related application comprises U.S. Ser. No. 155,556 entitled "Computer Controlled RF Noise and Modulation Analyzer," filed on in the names of John L. Nugent and Harvey M. Masters which application is also assigned to the assignee of the present invention.

BACKGROUND OF THE INVENTION

Field of the invention

This invention relates generally to electrical signal measuring apparatus and more particularly to a wave analyzer for measuring the noise spectra of RF signals over a predetermined frequency band.

Description of the prior art

Spectrum analyzers are devices well known to those skilled in the art and generally comprises a RF receiver wherein an incoming radio frequency signal is heterodyned with a local oscillator signal and the resulting intermediate frequency signal is passed through a wideband IF amplifier to a mixer stage where it is then heterodyned with the output of a sweeping oscillator. The resulting frequency spectrum is presented as a display on the oscilloscope which has a sweep synchronized with the frequency variation of the sweeping oscillator. This type of apparatus is adapted to separate an input signal into its individual frequency components so that fundamental harmonic and intermodulation products may be separately measured and evaluated. The instrument in effect is a tunable voltmeter of high selectivity and high sensitivity providing a measurement which can be made either by viewing an oscilloscope or reading the deflection of the needle of a voltmeter. Spectrum analyzers of the type described are taught, for example, in U.S. Pats. 2,630,528 issued to F. J. Kamphoefner, and 3,366,877, issued to L. J. Kinkel, et al. One type of wave analyzer providing a voltmeter indication is taught, for example, by the model 302A wave analyzer manufactured by the Hewlett-Packard Company.

While the above noted apparatus operates in its intended manner, it has been found to be quite limited because of either complexity, lack of versatility, or limited sensitivity as well as the inability to be remotely controlled by a programmer or a computer.

SUMMARY

The present invention discloses a wave analyzer which is particularly adapted to be controlled by a computer or other type of remote programmer and comprises generally the combination of a variable frequency oscillator which is swept by a ramp voltage generated by a digital sweep circuit driven from a fixed frequency clock signal. The output of the variable frequency oscillator which comprises a voltage variable multivibrator is first mixed with an input RF signal which may be, for example, a noise input, where it is heterodyned to provide, for example, a first set of sideband or IF signals. This IF is immediately fed to a second mixer which has the fixed clock signal applied thereto whereupon a second set of sidebands are produced which is then applied to a narrow band filter which eliminates all undesired IF frequencies. The double mixing operation provides a frequency window around the input frequency by which the noise input may be observed. The output of the narrow band filter is detected and fed to a digital voltmeter as well as to a threshold detector. When the input to the threshold detector exceeds a predetermined level corresponding to a selected noise input level, the threshold detector couples a control signal to the digital sweep circuit which stops the sweep at that point. The output frequency of the variable frequency oscillator is then controlled by means of an AFC circuit which produces a digital signal which is compared to the output of the digital sweep circuit for controlling the variable frequency oscillator.

DESCRIPTION OF THE PREFERRED EMBODIMENT

Figure 1:
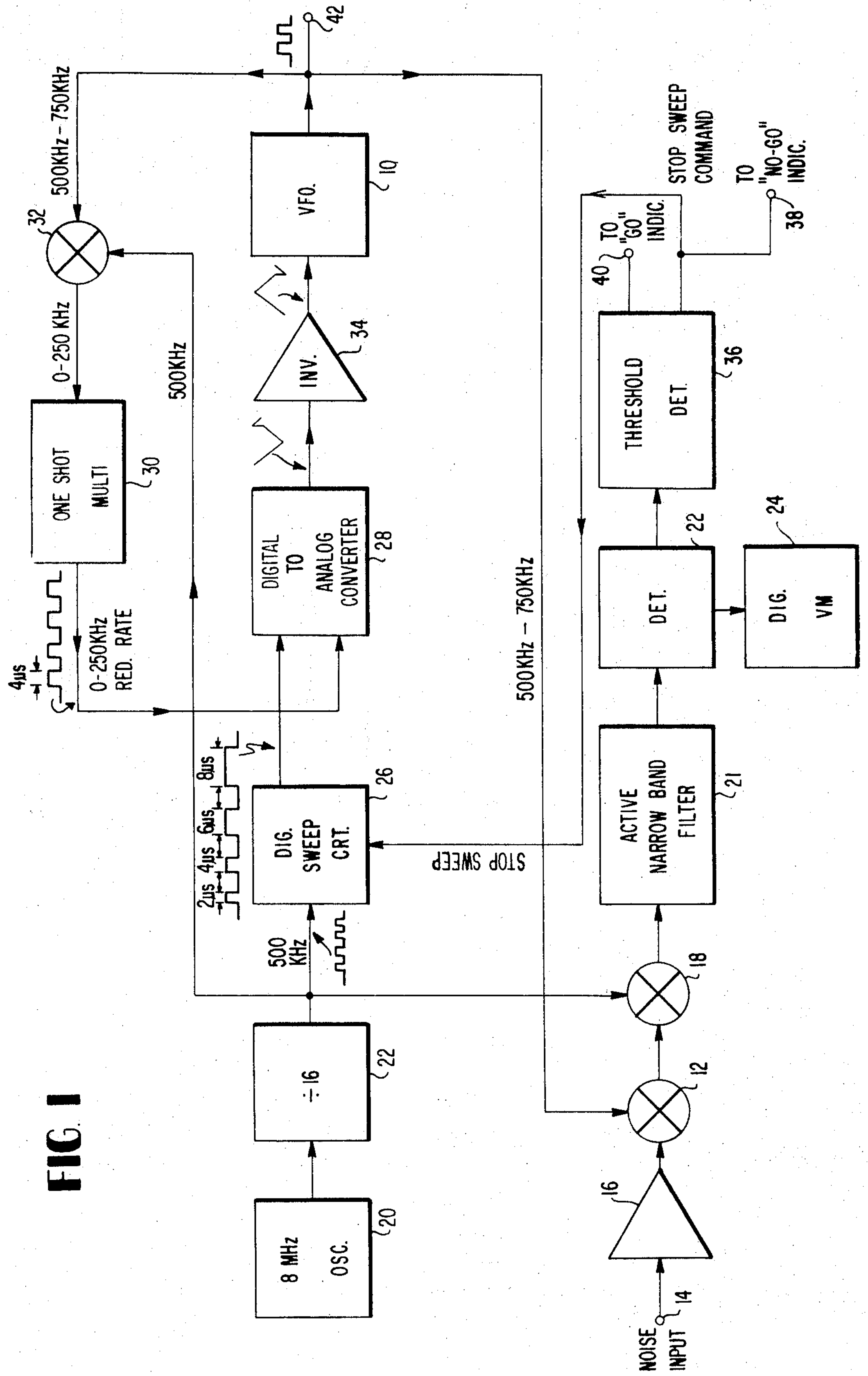
FIG. 1 is an electrical block diagram of the preferred embodiment of the subject invention.
Figure 2:
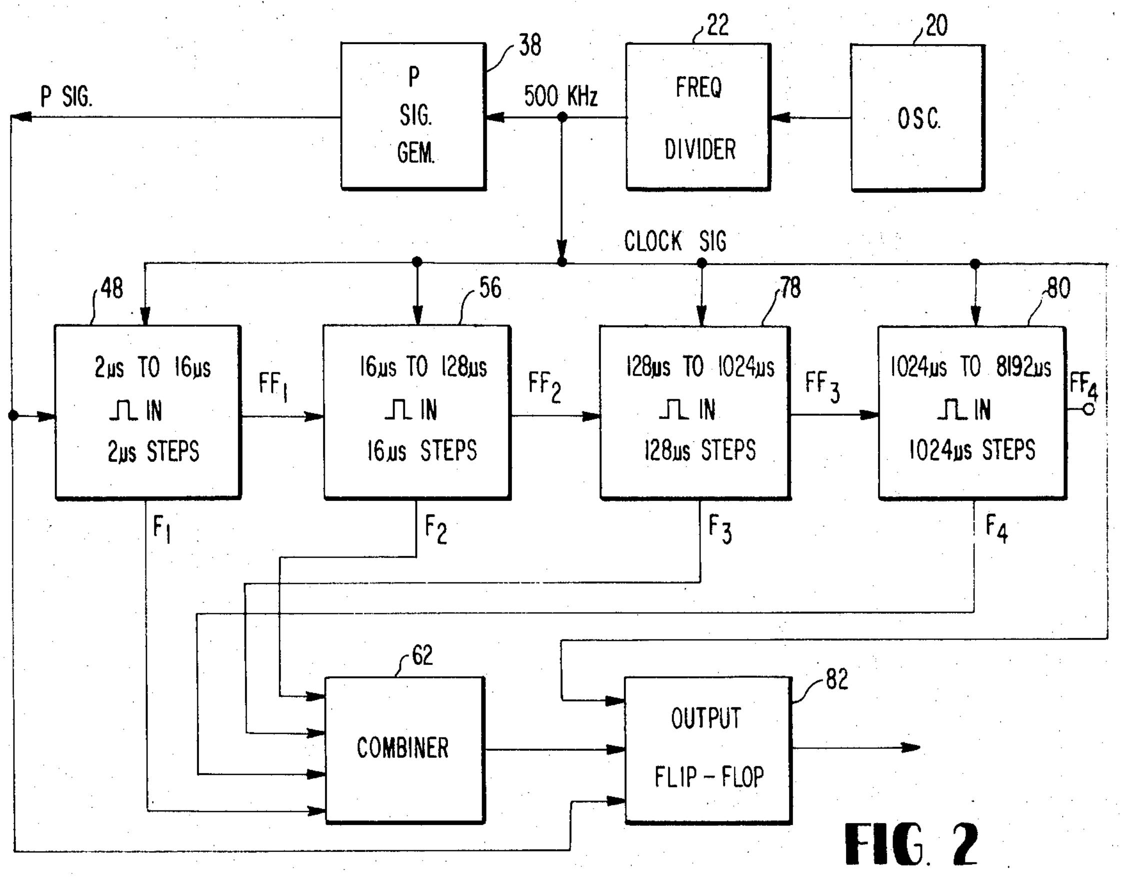
FIG. 2 is a block diagram illustrative of the digital sweep circuit shown in FIG. 1.

Referring now to the drawings and more particularly to FIG. 1, the preferred embodiment of the subject invention discloses, inter alia, a swept variable frequency oscillator 10 whose output frequency is heterodyned in a first mixer 12 with an input signal which may be, for example, a noise input signal adjacent a predetermined carrier frequency. The noise input is applied to input means generally designated by reference numeral 14 and fed to the mixer 12 through an impedance matching device 16 which may be comprised of, for example, an amplifier of a transistor emitter follower configuration. The variable frequency oscillator 10 which comprises a voltage variable multivibrator is a voltage controlled oscillator (VFO) which may be swept over a range of, for example, 500 kHz.–750 kHz. by means of a linear ramp signal applied to its input in a manner to be subsequently described. Assuming also for the sake of illustration that the input signal comprises a 1 kHz. noise signal, the output of the first mixer 12 will comprise upper and lower sidebands 1 kHz. above and below the VFO output frequency. The sideband frequencies are directly coupled into a second mixer 18 whose other input comprises a highly stable fixed frequency square wave signal, hereinafter referred to as the clock signal, generated by a fixed frequency oscillator 20 which may be, for example, an 8 mHz. clock. The output of the clock 20 is fed into a digital divider circuit 22 which may have, for example, a count of ÷16 which in turn provides an output of 500 kHz. It is the output of the divider circuit 22 which is applied to the other input of the second mixer 18.

It is to be noted that the clock signal frequency (500 kHz.) appearing at the output of the divider circuit 22 is within the range of the VFO sweep (500 kHz.–750 kHz.) and more particularly equal to the lower limit thereof. Accordingly, the output of the second mixer 18 comprises a second set of sideband frequencies, one component of which is equal to the input frequency of 1 kHz. Accordingly, a narrow band filter 21 is coupled to the output of the second mixer 18 for allowing the input 1 kHz. frequency to pass while rejecting all other frequency components. The filter 21 is preferably comprised of an active filter comprised of a plurality of interconnected amplifier stages having a bandwidth of, for example, 500 Hz. with a center frequency of, for example, 800 Hz. Such apparatus is well known to those skilled in the art. The 1 kHz. output from the narrow band filter 21 is next fed to an envelope detector circuit 22 which provides a DC output corresponding to the amplitude of the noise input signal applied to the input circuit means 14. This DC signal is coupled to a measuring device such as a digital voltmeter 24 which provides a direct reading of the level of the signal to be measured.

The embodiment of the subject invention shown in FIG. 1, however, is particularly adapted to be automatically controlled from an external source by the manner in which the variable frequency oscillator 10 is swept and controlled. To this end a digital sweep circuit 26 is coupled to the 500 kHz. clock signal provided at the output of the frequency divider 22. The sweep circuit 26 generates a square wave pulse train, the pulsewidth of which increases by the same increment throughout a predetermined time interval. For example, the pulsewidth of the sweep circuit output increases in 2 microsecond increments from 0 to 8192 microseconds over a 33.5 second interval. The digital sweep comprises 4095 square wave pulses of gradually increasing pulsewidth. The means by which this output is generated is shown in greater detail in FIGS. 2 through 5, which will be considered subsequently. However, it is to be noted that the pulsewidth increases at a constant rate throughout the 33.5 second interval.

By applying a digital-to-analog conversion, a linear DC ramp voltage is next derived which varies the frequency output of the VFO 10 linearly over the frequency range from 500 kHz. to 750 kHz. The means by which this is accomplished is through a digital-to-analog converter 28 which has two digital inputs applied thereto. One of the inputs constitutes the output of the digital sweep circuit 26 comprised of the regularly spaced variable pulsewidth square waves. The other input to the digital-to-analog converter comprises a digital AFC signal generated by a one-shot or monostable multivibrator 30 which is triggered by means of a digital signal applied from a third mixer 32 which has two inputs applied thereto comprising the output of the VFO 10 and the clock signal from the divider circuit 22, respectively. The output of the VFO 10 as noted earlier, comprises a square wave which may be generated, for example, by a voltage controlled multivibrator which varies in frequency between 500 kHz. and 750 kHz., depending upon the instantaneous magnitude of the DC ramp signal applied thereto.

The third mixer 32 then provides an output square wave corresponding to the frequency difference between the VFO output and the 500 kHz. clock signal. Since the frequency range of the VFO 10 is between 500 kHz. and 750 kHz., the output of the third mixer 32 varies between 0 and 250 kHz. depending upon the instantaneous frequency of the VFO 10. The monostable multivibrator 30 characteristically operates to provide a square wave output of a predetermined constant pulsewidth each time it is triggered. Therefore, the output of the multivibrator 30 constitutes a 4 microsecond square wave having a repetion rate varying between 0 and 250 kHz. This last mentioned digital signal is applied to the other input of the digital-to-analog converter 28. The digital-to-analog converter 28 operates as a differential filter which can be readily embodied by suitable operational amplifiers to provide an output of a linear DC voltage which is directly proportional to the average DC value of the difference between the digital sweep signal and the AFC signal. The AFC loop including the mixer 32 and the monostable multivibrator 30 tends to offset the effects of the sweep circuit control as the frequency difference between the VFO output and the clock signal decreases as well as maintaining a fixed output frequency from the VFO 10 upon stopping the sweep at a predetermined point over the range mentioned above. The voltage waveform out of the digital-to-analog converter 28 comprises a ramp voltage which is inverted in the amplifier 34 so that the signal applied to the VFO 10 is a positive going ramp DC voltage for sweeping the oscillator frequency from 500 kHz. to 750 kHz.

At the end of the 33.5 second time interval where the pulsewidth of the output of the digital sweep circuit 26 is 8192 microseconds, the digital sweep circuit automatically reverses providing a continuous pulse train whose pulsewidth decreases in the same increments as before until a pulsewidth of 128 microseconds is reached, whereupon the sweep is "reset" back to zero.

Any time a "stop sweep" signal is applied to the digital sweep circuit 26 the circuit will produce an output of a constant pulsewidth, occurring at the time the stop command was applied, until released. One such command is provided by a threshold detector circuit 36 coupled to the envelope detector 22. If during the sweep of the VFO 10 the detector output exceeds a predetermined level set either manually or by remote control, a "stop" command signal is applied to the digital sweep circuit 26. This signal is also applied to terminal 38 which can be coupled, for example, to a "no go" indicator of any desired type. If on the other hand a predetermined threshold is not exceeded during a sweep of the VFO 10, a signal will be provided at terminal 40, which is adapted to be coupled to a "go" indicator of any selected type whereupon the sweep will again be initiated. If the threshold detector 36 is activated such that a "stop" signal is applied to the digital sweep circuit 26, the output frequency of the VFO 10 will "freeze" at the position of excessive input which may be an excessive noise input. By coupling a frequency counter to terminal 42 which is common to the output of the VFO 10 the frequency of the input signal can be obtained merely by subtracting 500 kHz. from the frequency reading obtained at terminal 42.

Figure 3:
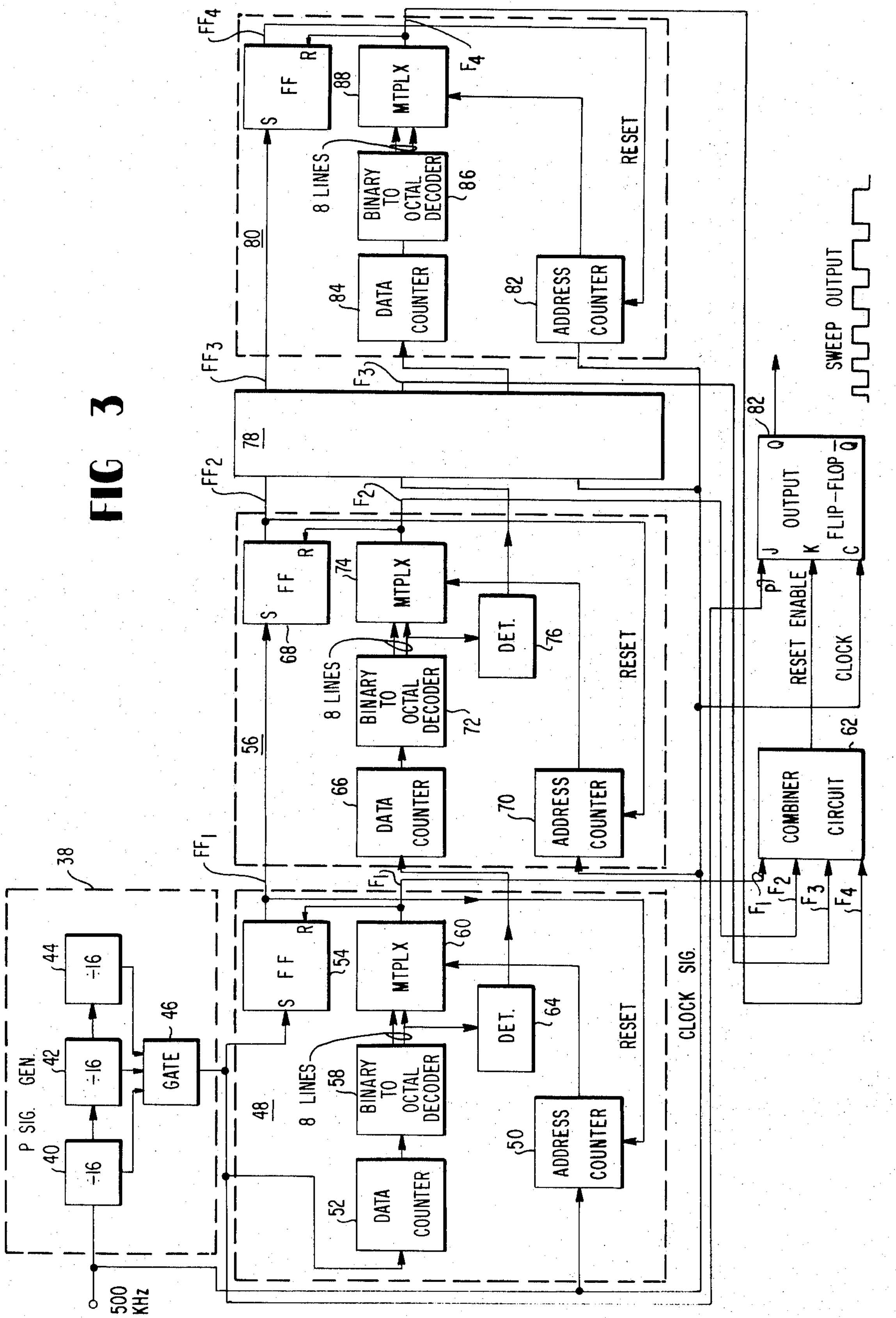
FIG. 3 is a block diagram more fully illustrative of the sweep circuit shown in FIG. 2.

Since the VFO 10 is essentially controlled in accordance with the digital output of the sweep circuit 26 and because it is this feature that particularly adapts the present invention for external digital control, it becomes desirable to further describe the preferred embodiment of the digital sweep circuit shown in FIG. 1 and its operation. Accordingly, FIG. 2 discloses generally in block diagrammatic form the implementation of the digital sweep circuit 26 while FIG. 3 is a more detailed block diagram of the embodiment shown in FIG. 2. Considering now FIGS. 2 and 3 in conjunction with FIG. 5 which discloses time related waveforms generated by circuitry disclosed therein, the oscillator 20 and the frequency divider 22 shown in FIG. 1 generates a one microsecond square wave pulse at a repetition rate of 500 kHz. as shown by waveform (*a*) of FIG. 5. As noted, this 500 kHz. signal has been defined as the clock signal. The clock signal is first fed into a P signal generator 38 comprised of three ÷16 frequency dividers 40, 42 and 44 (FIG. 3) which feed into a gate circuit 46 for generating a P signal output therefrom which comprises a one microsecond pulse occurring over a time period of 8192 microseconds such as shown by waveform (*b*) of FIG. 5.

The P signal is fed to a first circuit stage 48 which additionally receives the clock signal input and generates a first sequence of square wave pulses which increase from a 2 microsecond pulsewidth to a 16 microsecond pulsewidth in 2 microsecond steps. This pulse sequence is designated $FF_1$ and is illustrated as waveform (*c*) shown in FIG. 5. Additionally, the first circuit stage 48 also generates a time stepped 1 microsecond pulse whose trailing edge is coincident in time with each of the pulses included in the signal $FF_1$. This signal is designated $F_1$ and is illustrated by waveform (*d*) shown in FIG. 5.

In order to more fully explain the relationship between the pulse sequence $FF_1$ and $F_1$, attention is directed now to FIG. 3, wherein the first circuit stage 48 is shown in greater detail. Stage 48 includes an address counter 50 which has the 500 kHz. clock pulse train applied thereto as well as a data counter 52 which has the P signal pulse train applied thereto. Additionally, the P signal input is applied to the set (*s*) input of a flip-flop circuit 54 whose output signal comprises the aforementioned pulse sequence $FF_1$. This signal is utilized to "reset" the address counter 50 as well as being coupled to the following or second circuit stage 56 which is adapted to produce a pulse train varying in pulsewidth from 16 microseconds to 128 microseconds in 16 microsecond steps.

Referring back to the first stage 48, the data counter 52 is coupled to a binary-to-octal decoder 58 which provides eight output lines which are fed to a digital multiplexer 60. The multiplexer 60 may be thought of as an eight position single pole switch which is indexed sequentially to sense the data content in each position and when a binary pulse appears thereat it is coupled to the reset input of the flip-flop circuit 54 causing it to change state. This accounts for the synchronism between the waveform (*d*) and (*c*) shown in FIG. 5. The occurrence of a pulse at the output of the multiplexer 60 which comprises the signal $F_1$ is also fed to a combiner circuit 62 for purposes which will be subsequently explained.

A detector circuit identified by reference numeral 64 provides an output whenever the multiplexer input is recycled, that is, whenever the multiplexer input is switched from the last of the eight lines from the decoder 58 back to the first line. The leading edge of the P signal applied to the data counter 52 changes the state of the counter by one count. Also, the trailing edge of the P signal "sets" the flip-flop circuit 54 as previously noted which in turn enables the address counter 50. The clock signal applied to the address counter is counted until flip-flop 54 is turned off by the $F_1$ output from the multiplexer 60. When a 16 microsecond pulse of $FF_1$ is produced at the time that the multiplexer 60 is connected to the last line from the decoder 58, the detector 64 couples a signal into the data counter 66 of the second stage 56. Whereas the flip-flop circuit 54 has the P signal applied thereto, a similar flip-flop circuit 68 has the $FF_1$ pulse train applied to the set input thereof.

The second stage 56 also includes an address counter 70, a binary-to-octal decoder 72, a multiplexer 74 and a detector 76, as in the first stage 48. The second stage operates in a manner similar to the first stage 48 to develop a pulse train increasing in 16 microsecond increments from 16 microseconds to 128 microseconds as evidenced by the signal $FF_2$ shown by wavefrom (*e*) of FIG. 5. In the same manner, a one microsecond pulse $F_2$ shown by waveform (*f*) is developed in synchronism with the trailing edge of each of the pulses forming the pulse train $FF_2$. The one microsecond pulse $F_2$ is also fed into the combiner circuit 62.

Figure 5:
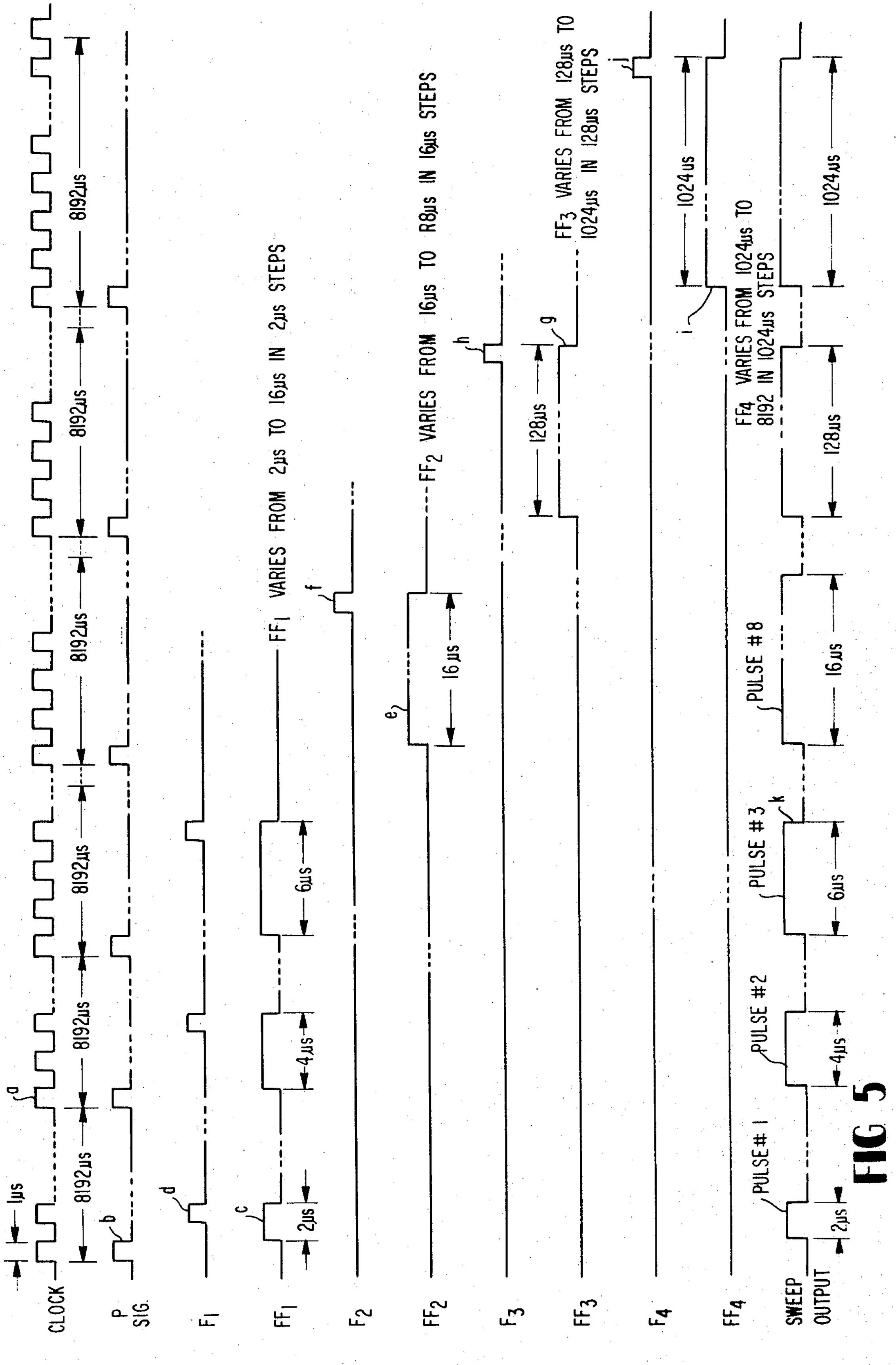
FIG. 5 is a set of time related waveforms illustrative of the operation of the digital sweep circuit illustrated in FIGS. 2 and 3.

A third circuit stage 78 which is identical to the second circuit stage 66, is coupled thereto and generates a pulse train which varies in pulsewidth from 128 microseconds to 1024 microseconds in 128 microsecond steps or increments shown by waveform (*g*) of FIG. 5. Also, a one microsecond pulse having a coincident trailing edge with the trailing edge of the pulses of waveform (*g*) and designated $F_3$ shown by waveform (*h*) in FIG. 5 is applied to the combiner circuit 62.

Finally, a fourth circuit stage 80 which is similar to the preceding circuit stages with the exception that the octal cross-over detector circuit is deleted, but includes an address counter 82, a data counter 84, a binary-to-octal decoder 86 and a multiplexer 88 generates a pulse sequence varying in 1024 microseconds steps between a pulsewidth of 1024 microseconds and 8192 microseconds which is the total time period between each pulse of the P signal pulse train, waveform (*b*). The varying pulsewidth output from the fourth stage 80 comprises the signal $FF_4$ as shown by waveform (*i*) of FIG. 5 while its time related one microsecond pulse $F_4$ is shown by waveform (*j*).

Figure 4:
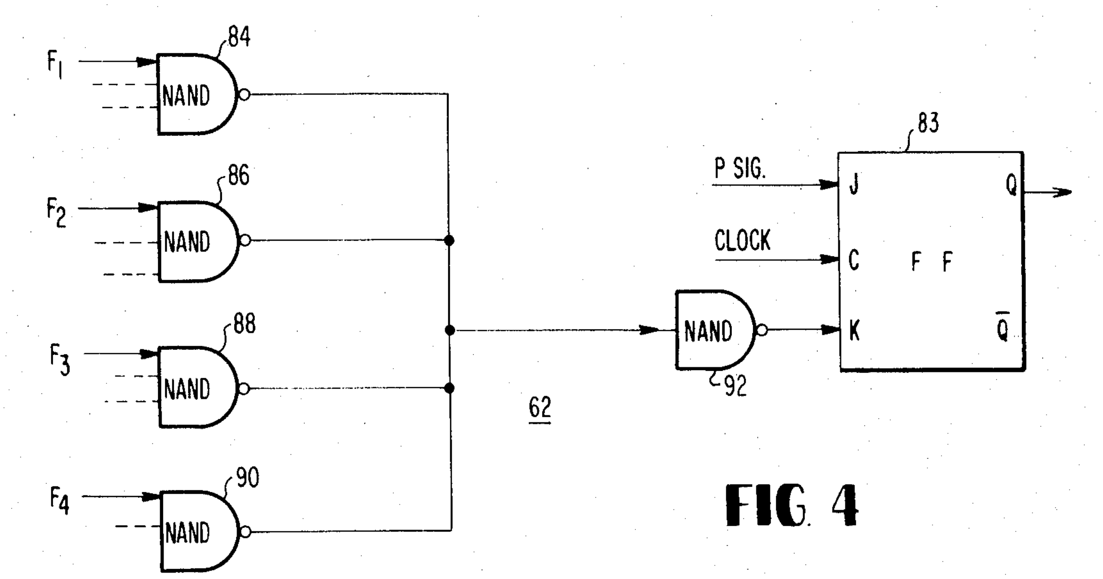
FIG. 4 is a schematic diagram of the combiner circuit shown in FIGS. 2 and 3.

What has been shown and described thus far is four circuit stages 48, 56, 78 and 80 which act as a shift register or odometer in a sense that every time that each respective stage generates its maximum pulsewidth signal, it recycles itself but at the same time causes the succeeding stage to immediately start generating its respective sequence. What has been developed is a combination of four separate pulse trains which are capable of being combined to provide a single uninterrupted output pulse train of 4095 non-repetitive pulses varying in pulsewidth from 2 microseconds to 8192 microseconds in 2 microsecond increments. If the pulse trains $FF_1$, $FF_2$, $FF_3$ and $FF_4$ were simply combined for example in an OR logic circuit, communtation spikes would occur at the transition between the respective pulse trains. In order to avoid the apperance of commutation spikes in the output waveform, a combiner circuit such as shown in FIG. 4, is coupled to an output flip-flop circuit 83. It is comprised of four NAND gates 84, 86, 88, and 90, having one input thereof coupled respectively to the pulses $F_1$, $F_2$, $F_3$ and $F_4$ which coincide with the trailing edges of the pulses included in $FF_1$, $FF_2$, $FF_3$ and $FF_4$. The output of the NAND circuits 84 . . . 90 is coupled into a fifth NAND gate 92 whose output is applied to one input (K) of the flip-flop 82. If the K input is designated the "rest" input enable while the J input is designated the "set" input enables to the flip-flop 92, and if the flip-flop is made responsive to a negative going trigger at the clock input C, i.e., the trailing edge of an input clock pulse, the application of the P signal to the J input of flip-flop 82 will effect the initiation of an output pulse at the Q terminal with the arrival of the next clock pulse. The output pulse at Q will be terminated by the reset pulse applied to the K terminal from the combiner conduit 62 and the trailing edge of the following clock pulse applied to terminal C. It can be seen, therefore, that a pulse train having no commutation spikes and with edges coicident with 500 kHz. clock source will be generated by the flip-flop 83 by the P signal and the combined output of the pulses $F_1$ . . . $F_4$. This pulse train comprises the sweep output from the digital sweep circuit 26 shown in FIG. 1 and is illustrated by waveform (*k*) shown in FIG. 5.

The data counters 52, 66 . . . and 84 are in reality up-down counters which easily permit the pulse sequence comprising the sweep output to start decreasing in pulsewidth when an 8192 microsecond is produced so that the sequence reverses and declines down to a predetermined pulsewidth, for example, 128 microseconds whereupon the pulses stop and the circuitry is reset back to zero. This circuitry is not shown in any great detail in the subject embodiment but can easily be implemented by one skilled in the art to which this circuit pertains.

What has been shown and described, therefore, is an electrical waveform or noise signal analyzer which operates in a digital mode having a variable frequency oscillator controlled by an analog signal developed from a digital sweep circuit.

Having thus described the present invention with which is at present considered to be the preferred embodiment thereof,

We claim as our invention:

1. A digitally controlled wave analyzer comprising in combination:

a first mixer circuit connected to receive an input signal;

a variable frequency signal source connected to said first mixer circuit and being operable to generate a selectively variable output frequency for producing first sideband frequency signals from said first mixer;

a second mixer circuit coupled to the output of said first mixer circuit to receive said first sideband signals;

a fixed frequency signal source coupled to said second mixer circuit for producing second sideband frequency signals;

a narrow band filter coupled to the output of said second mixer and having a center frequency in the region of the frequency of said input signal;

detector means coupled to said narrow band filter for detecting the envelope of said input signal;

a digital sweep circuit coupled to said fixed frequency signal source and responsive to said fixed frequency signal to produce a digital pulsed sequence of linearly varying pulsewidths; and circuit means coupled between said digital sweep circuit and said variable frequency signal source for converting said pulse train into a linearly varying DC voltage for controlling the frequency of said variable frequency signal source.

2. The invention as defined by claim 1 and additionally including:

means coupled to said detector for measuring the electrical power or relative amplitude of said input signal, and a threshold circuit coupled from the output of the detector circuit to the digital sweep circuit for stopping the sweep circuit when a predetermined threshold level is exceeded and causing the digital sweep circuit to produce a pulse train of a constant width pulses at the point in the sweep at which the threshold was exceeded.

3. The invention as defined by claim 2 wherein said variable frequency signal source and said fixed frequency signal source produce digital type square wave output signals and wherein the output frequency range of said variable frequency signal source includes frequencies substantially close to the output frequency of said fixed frequency signal source.

4. The invention as defined by claim 3 wherein said circuit means coupled from said digital sweep circuit to said variable frequency signal source comprises a digital-to-analog converter.

5. The invention as defined by claim 4 and additionally including a third mixer circuit coupled to the output of said fixed frequency signal source and the output of said variable frequency signal source to provide a difference frequency square wave output therefrom;

a monostable multivibrator circuit triggered by and having a repetition rate of said difference frequency square wave output and providing a constant pulsewidth output having a repetition rate equal to said difference frequency, and including circuit means for coupling the output of said monostable multivibrator to the input of said digital-to-analog converter wherein said converter operates on said pulse train output of said digital sweep circuit and the output of said monostable multivibrator to provide a linear DC voltage which is directly proportional to the average value between the two inputs thereto.

6. The invention as defined by claim 5 and additionally including an inverter amplifier circuit coupled between said digital-to-analog converter and said variable frequency signal source.

7. The invention as defined by claim 6 wherein said variable frequency signal source comprises a voltage variable multivibrator.

8. The invention as defined by claim 7 wherein said digital sweep circuit comprises:

first circuit means coupled to said fixed frequency signal source for providing an output pulse train having a predetermined constant frequency;

second circuit means coupled to the output of said first circuit means and said fixed frequency source for generating a first pulse train of constant pulsewidth and having linearly increasing time delays with respect to said output pulse train of said first circuit means and a first pulse train having linearly increasing pulsewidth between a first pulsewidth limit and a second pulsewidth limit and being time related to said output pulse train and said first pulse train of constant pulsewidth;

third circuit means coupled to said second circuit means and said fixed frequency source for generating a second pulse train of constant pulsewidth and having linearly increasing time delays greater than the time delays of said first pulse train of constant pulsewidth and a second pulse train having linearly increasing pulsewidths between said second pulsewidth limit and a third pulsewidth limit and being time related to said output pulse train and said second pulse train of constant pulsewidth;

fourth circuit means coupled to said third circuit means and said fixed frequency source for providing a third pulse train of constant pulsewidth and having linearly increasing time delays greater than the time delays of said second pulse train of constant pulsewidth and a third pulse train having linearly increasing pulsewidth between said third pulsewidth limit to a fourth pulsewidth limit and being time related to said output pulse train and said third pulse train of constant pulsewidth;

fifth circuit means coupled to said fourth circuit means and said fixed frequency source for providing a fourth pulse train of constant pulsewidth and having linearly increasing time delays greater than said third pulse train of constant pulsewidth and a fourth pulse train of constant pulsewidth and a fourth pulse train having linearly increasing pulsewidths from said fourth pulsewidth limit to a fifth pulsewidth limit; and circuit means for combining selected pulse trains from said second, third, fourth and fifth circuit means for providing a single linearly increasing pulsewidth pulse train varying in pulsewidth between said first and fifth pulsewidth limit.

9. The invention as defined by claim 8 wherein said last recited circuit means comprises a combiner circuit having input means coupled to said first, second, third and fourth pulse trains of constant pulsewidth and a flip-flop circuit having a set and a reset input terminal and an output terminal and including circuit means for coupling the set input terminal to said output pulse train from said first circuit means and the reset input to the output of said combiner circuit means whereupon said output terminal provides said single pulse train.

10. The invention as defined by claim 8 wherein said output pulse train from said first circuit has a frequency substantially less than said fixed frequency from said fixed frequency source.

References Cited

UNITED STATES PATENTS

| | | | |
|---|---|---|---|
| 3,320,531 | 5/1967 | Wu | 324—77 B |
| 3,344,350 | 9/1967 | Stoft | 324—77 B |
| 3,427,536 | 2/1969 | Wainwright | 324—77 B |

STANLEY T. KRAWCZEWICZ, Primary Examiner

U.S. Cl. X.R.

324—57 N